United States Patent
Lacaze et al.

(10) Patent No.: US 10,416,270 B2
(45) Date of Patent: Sep. 17, 2019

(54) DETECTION OF MULTI-ROTORS USING ELECTROMAGNETIC SIGNATURES

(71) Applicants: Alberto Daniel Lacaze, Potomac, MD (US); Karl Nicholas Murphy, Rockville, MD (US)

(72) Inventors: Alberto Daniel Lacaze, Potomac, MD (US); Karl Nicholas Murphy, Rockville, MD (US)

(73) Assignee: Robotic Research, LLC, Gaithersburg, MD (US)

( * ) Notice: Subject to any disclaimer, the term of this patent is extended or adjusted under 35 U.S.C. 154(b) by 227 days.

(21) Appl. No.: 15/134,082

(22) Filed: Apr. 20, 2016

(65) Prior Publication Data
US 2016/0305758 A1    Oct. 20, 2016

Related U.S. Application Data

(60) Provisional application No. 62/149,744, filed on Apr. 20, 2015.

(51) Int. Cl.
G01B 7/14 (2006.01)
G01N 27/02 (2006.01)
G01S 5/00 (2006.01)

(52) U.S. Cl.
CPC .................... G01S 5/00 (2013.01)

(58) Field of Classification Search
CPC .......... G01B 7/14; G01N 27/02; B64C 13/50; B64C 27/08; B64C 27/14
See application file for complete search history.

(56) References Cited

U.S. PATENT DOCUMENTS

| | | | |
|---|---|---|---|
| 8,639,409 B2* | 1/2014 | Ramaswamy | B60L 11/1844 700/291 |
| 9,407,000 B1* | 8/2016 | Willistein | H01Q 1/08 |
| 9,802,701 B1* | 10/2017 | Hawes | B64C 39/024 |
| 2005/0077424 A1* | 4/2005 | Schneider | F41G 7/303 244/3.11 |
| 2009/0313755 A1* | 12/2009 | Burrell, VI | A47D 15/008 5/93.1 |
| 2010/0299067 A1* | 11/2010 | McCollough | G01S 13/9303 701/301 |
| 2016/0069994 A1* | 3/2016 | Allen | G01S 13/9303 342/29 |
| 2017/0043862 A1* | 2/2017 | Lippincott | B64C 13/50 |

* cited by examiner

*Primary Examiner* — Neel D Shah
(74) *Attorney, Agent, or Firm* — Radha Narayanan

(57) ABSTRACT

Multi-rotors use multiple electric motors to drive propellers that allow the multi-rotor to fly, turn, bank, etc. The multiple motors and the associated control device produce EM signals that can be used to detect multi-rotors and distinguish them from other devices with electric motors. To drive a brushless motor, the ESC takes DC from the battery and turns it into three phase AC (sinusoidal or trapezoidal wave), and then measures back EMF pulses (sensorless). This allows one to ensure that the three phase AC is being generated at the proper frequency to turn the motor (timing). For each propeller in the multi-rotor there are usually four different correlated signals at multiple frequencies that are used for detection and false alarm rejection.

22 Claims, 3 Drawing Sheets

DETECTION OF MULTI-ROTORS USING ELECTROMAGNETIC SIGNATURES

CROSS REFERENCE TO RELATED APPLICATIONS

This application claims priority from U.S. patent application Ser. No. 62/129,471, entitled "DETECTION OF MULTI-ROTORS USING ELECTROMAGNETIC SIGNATURES", filed on 20 Apr. 2015. The benefit under 35 USC § 119(e) of the United States provisional application is hereby claimed, and the aforementioned application is hereby incorporated herein by reference.

TECHNICAL FIELD OF THE INVENTION

The present invention relates generally to the detection of air born vehicles. More specifically, the present invention relates to the detection of un manned air vehicles (UAVs) utilizing multi-rotors.

BACKGROUND OF THE INVENTION

Unmanned Air Vehicles (UAVs), and multi-rotors in particular, are starting to be used as tools to transport illegal contraband into prisons or across borders. In addition, they can be used as explosives, or as Chemical, Biological, Radiological, Nuclear and Explosive (CBRNE) delivery mechanisms. Both accidental and purposeful attempts at reaching military and civilian government installations with UAVs have already transpired, including an accidental landing at the White House in April 2015.

As the cost lowers and the variety of multi-rotors proliferates, it is likely that such incidents will become commonplace. Therefore, implementing a device that can detect and localize multi-rotors will help law enforcement located at these and other installations, as well as provide more effective flight restrictions.

Multi-rotors are small, and can be flown close to the ground where acoustic, visual, radar, and heat signatures are easily masked by the surroundings. Detection in these conditions is difficult, and often too late. Therefore, what is needed is a detection means that is easy to deploy and that can accurately identify these particular aircraft.

Definitions

AC stands for alternating current, which means the electrical current frequently reverses direction. AC electricity is measured according to its cycles, with one complete cycle being counted each time a given current travels in one direction and then doubles back on itself.

Most modern ESCs incorporate a battery eliminator circuit (or BEC) to regulate voltage for the receiver, removing the need for separate receiver batteries. BECs are usually either linear or switched mode voltage regs in the broader sense are PWM controllers for electric motors. The ESC generally accepts a nominal 50 Hz PWM servo input signal whose pulse width varies from 1 ms to 2 ms. When supplied with a 1 ms width pulse at 50 Hz, the ESC responds by turning off the DC motor attached to its output. A 1.5 ms pulse-width input signal drives the motor at approximately half-speed. When presented with 2.0 ms input signal, the motor runs at full speed.

In direct current (DC), the electric charge (current) only flows in one direction.

Electromagnetic radiation (EM radiation or EMR) is the radiant energy released by certain electromagnetic processes. Visible light is one type of electromagnetic radiation; other familiar forms are invisible electromagnetic radiations, such as radio waves, infrared light and X rays.

An electronic speed control or ESC is an electronic circuit with the purpose to vary an electric motor's speed, its direction and possibly also to act as a dynamic brake. ESCs are often used on electrically powered radio controlled models, with the variety most often used for brushless motors essentially providing an electronically generated three-phase electric power low voltage source of energy for the motor.

Electric and magnetic fields (EMFs) are invisible areas of energy, often referred to as radiation.

Pulse-position modulation (PPM) is a signal modulation used for both analog and digital signal transmissions.

PWM stands for Pulse Width Modulation

RC transmitters use PWM or PPM for transferring digital signal. PWM stands for Pulse Width Modulation and PPM stands for Pulse Position Modulation. PWM is a technique used to relay data in the form of a varying pulse width. In PPM (Pulse Position Modulation) the analogue sample values determine the position of a narrow pulse relative to the clocking time.

Very low frequency or VLF is the ITU designation for radio frequencies (RF) in the range of 3 kHz to 30 kHz and wavelengths from 10 to 100 kilometers. Due to its limited bandwidth, audio (voice) transmission is highly impractical, and therefore, only low data rate coded signals are used.

SUMMARY OF THE INVENTION

The present invention bypasses these issues by identifying and tracking electro-magnetic (EM) signatures that distinguish multi-rotors and other multi-rotors from background noise. Multi-rotors use multiple electric motors to drive propellers that allow the multi-rotor to fly, turn, bank, etc. The multiple motors and the associated control device produce electromagnetic (EM) signals that can be used to detect multi-rotors and distinguish them from other devices with electric motors.

To drive a brushless motor, the ESC takes DC from the battery and turns it into three phase AC (sinusoidal or trapezoidal wave), and then measures back EMF pulses (sensorless). This allows one to ensure that the three phase AC is being generated at the proper frequency to turn the motor (timing).

For each propeller in the multi-rotor there are usually four different correlated signals at multiple frequencies that are used for detection and false alarm rejection.

BRIEF DESCRIPTION OF THE DRAWINGS

The accompanying drawings, which are incorporated herein a form a part of the specification, illustrate the present invention and, together with the description, further serve to explain the principles of the invention and to enable a person skilled in the pertinent art to make and use the invention.

DETAILED DESCRIPTION OF THE INVENTION

In the following detailed description of the invention of exemplary embodiments of the invention, reference is made to the accompanying drawings (where like numbers represent like elements), which form a part hereof, and in which is shown by way of illustration specific exemplary embodiments in which the invention may be practiced. These embodiments are described in sufficient detail to enable those skilled in the art to practice the invention, but other embodiments may be utilized and logical, mechanical, electrical, and other changes may be made without departing from the scope of the present invention. The following detailed description is, therefore, not to be taken in a limiting sense, and the scope of the present invention is defined only by the appended claims.

In the following description, numerous specific details are set forth to provide a thorough understanding of the invention. However, it is understood that the invention may be practiced without these specific details. In other instances, well-known structures and techniques known to one of ordinary skill in the art have not been shown in detail in order not to obscure the invention. Referring to the figures, it is possible to see the various major elements constituting the apparatus of the present invention.

The present invention bypasses these issues by identifying and tracking electro-magnetic (EM) signatures that distinguish multi-rotors and other multi-rotors from background noise. Multi-rotors use multiple electric motors to drive propellers that allow the multi-rotor to fly, turn, bank, etc. The multiple motors and the associated control device produce EM signals that can be used to detect multi-rotors and distinguish them from other devices with electric motors.

In particular, multi-copters are controlled by a microcontroller that generates a control signal—usually Pulse Position Modulation (PPM) or Pulse Width Modulation (PWM). The signal is interpreted and amplified by an electronic speed control (ESC) to drive the electric motors (usually brushless). Moreover, the blade speeds of the multi-copters tend to be similar, and correlated to each other and related to the control the maneuvers of the vehicle. Therefore, there are a number of correlated EM signatures, at different frequencies, which can be used for differentiating EM signals emitted from multi-rotors from EM signals emitted from other electric motors. The devices emit at very low frequency (VLF) and lower that are capable of traversing long distances, and therefore provide sufficient separation, making the detector useful to law enforcement or others.

Figure 1:
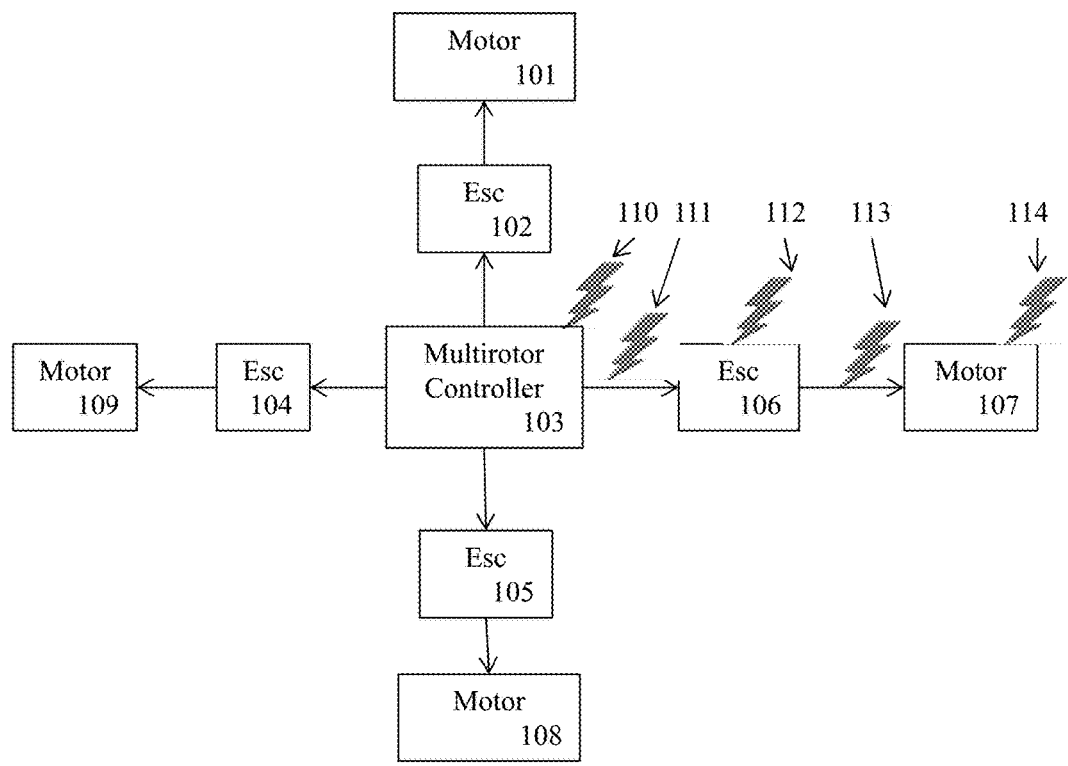
FIG. 1. Multi-rotor control diagram showing electromagnetic emissions at different stages. This illustrations shows four motors but it is understood that it could be three or more.

FIG. 1 shows the block diagram of a multi-rotor controller. The control signal is generated by the multi-rotor controller 103; this signal (usually PPM or PWM) is sent to the ESCs 102, 104, 105, and 106. The PPM and PWM signals have a set of distinct carrier frequencies in the VLF range and lower, which can travel significant distances. Once this signal arrives at the ESCs 102, 104, 105, and 106, it is sent to a series of amplifiers that generate the signals to drive the motors 101, 107, 108, and 109. To drive a brushless motor, the ESC ESCs 102, 104, 105, and 106 take DC from the battery and turn it into three phase AC (sinusoidal or trapezoidal wave), and then measure back EMF pulses (sensorless). This allows one to ensure that the three phase AC is being generated at the proper frequency to turn the motors 101, 107, 108, and 109 (timing).

Once again, these signals are transmitting in the VLF range (and lower) at multiples of the propeller speed. Once the signals arrive to the motors 101, 107, 108, and 109, the coils in the motors 101, 107, 108, and 109 also act as antennas, emitting VLF (and lower) as the motors 101, 107, 108, and 109 rotates through their phases. FIG. 1 shows some of the typical places where VLF (and lower) emissions can be measured 110, 111, 112, 113, and 114. In summary for each propeller in the multi-rotor there are usually four different correlated signals at multiple frequencies that are used for detection and false alarm rejection.

As stated earlier, the propellers in the multi-copter rotate at similar speeds, but not exactly at the same speed as the operator or controller (using GPS and or IMU) steers the vehicle to achieve destination. Having these signatures is one more clue to reduce false alarms.

Different antenneas can be used. Some antennas have a null spot that does not receive well. If the multi-rotor were in that direction, it would not be able to be detected. By rotating this null and monitoring for signal drop, one can determine the direction to the multi-rotor. Directional antennas (either mechanically or electrically steered) can be used to deduce direction. Likewise, the phase shift between the signal received at multiple antennas at different locations can be used to deduce range. Range to the multi-rotor can be determined by amplitude of the signal. Multiple antennas determine heading can be used to determine range by triangulation.

Figure 2:
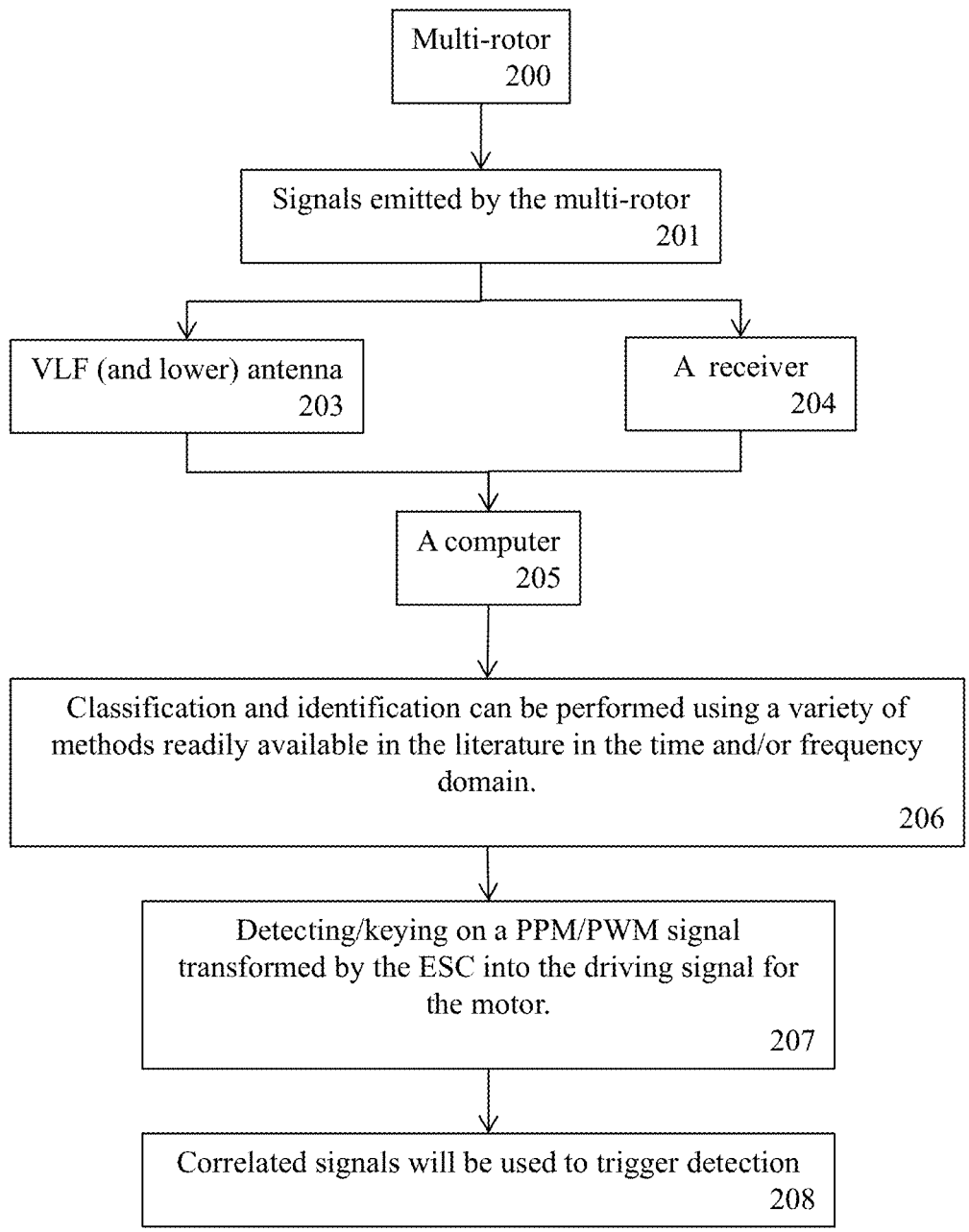
FIG. 2. A flow chart the physical device of the present invention device

Now referring to FIG. 2, the device is composed of a VLF (and lower) antenna 203, a receiver 204, and a computer 205. The VLF (and lower) antenna 203 will receive the signals emitted by the multi-rotor 200, and will use a computer 205 to classify them. In particular, the device will be detecting/keying on a PPM/PWM signal transformed by the ESC into the driving signal for the motor 207. Some or all of these correlated signals will be used to trigger detection 208. Each signal sequence will be tracked separately for each motor. Classification and identification can be performed using a variety of methods readily available in the literature in the time and/or frequency domain 206.

For example, first detecting in the frequency domain the square wave produced by the PWM, then finding at a different frequency (usually lower) a highly correlated motor emissions for each winding and finally finding the phase shift in the time domain for all the phases of the motor.

Figure 3:
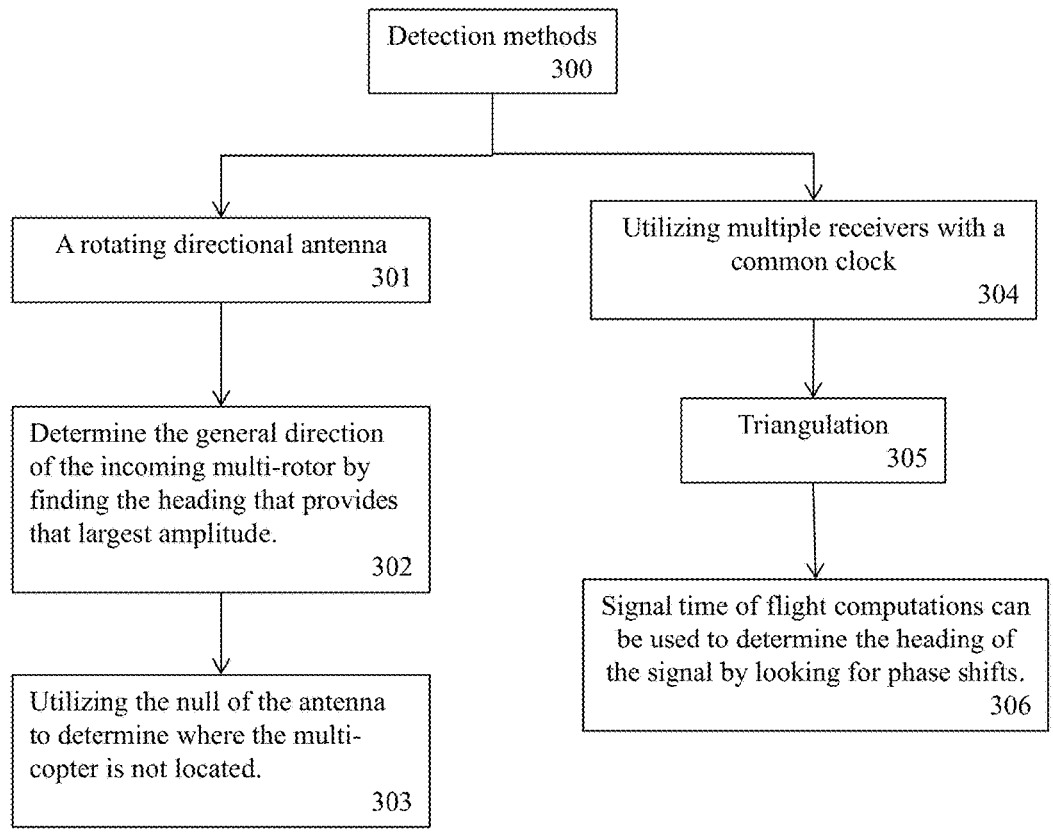
FIG. 3. A flow chart illustrating the detection method of the present invention.

Now referring to FIG. 3, in order to detect location, two methods 300 are used. The first method utilizes a rotating directional antenna 301, the device can determine the general direction of the incoming multi-rotor by finding the heading that provides that largest amplitude 302. Or by utilizing the null of the antenna to determine where the multi-copter is not located 303. The second method uses triangulation 305—utilizing multiple receivers with a common clock 304—signal time of flight computations can be used to determine the heading of the signal by looking for phase shifts 306.

Finally, the proposed device can be used as a cue for other detection devices or countermeasures by providing heading and propeller speed. In particular, the motor driving signals will be highly correlated to the acoustic signals. The delay between the EM signal (travelling at the speed of light) and the acoustic signal (travelling at the speed of sound) can be used for calculating distance to the vehicle. The acoustic/EM combination can also be used as false detection rejection.

Thus, it is appreciated that the optimum dimensional relationships for the parts of the invention, to include variation in size, materials, shape, form, function, and manner of operation, assembly and use, are deemed readily apparent and obvious to one of ordinary skill in the art, and all equivalent relationships to those illustrated in the drawings and described in the above description are intended to be encompassed by the present invention.

Furthermore, other areas of art may benefit from this method and adjustments to the design are anticipated. Thus, the scope of the invention should be determined by the appended claims and their legal equivalents, rather than by the examples given.

The embodiments of the invention in which an exclusive property or privilege is claimed are defined as follows:

1. A program storage device readable by a computer machine, tangibly embodying program instructions executable by the computer machine to perform method steps to detect multi-copters and other electric vehicles for transport of illegal contraband into prisons or across borders composed of:
    using a very low frequency (VLF) antenna and receiver;
    using a computer or microcontroller;
    detecting electromagnetic (EM) signals from a multiple motor vehicle and an associated control device;
    identifying and tracking the electro-magnetic (EM) signatures of a multiple motor vehicle; and
    distinguishing an identified and tracked multiple motor vehicle from other multiple motor vehicles based on the unique electro-magnetic (EM) signatures of a multiple motor vehicle.

2. The method of claim 1, which uses a pulse position modulation/pulse width modulation (PPM/PWM) signal only.

3. The method of claim 1, which uses a motor driving signal only.

4. The method of claim 1, detecting similar but not exact frequencies for electro-magnetic (EM) signatures of multiple motor vehicles having any plurality of motors.

5. The method of claim 1, which uses a signal coming from the battery eliminator circuit (BEC).

6. The method of claim 1, which uses a signal coming from the wire between the multiple motor vehicle and the associated control device.

7. The method of claim 1, which uses a signal coming from the battery wire to each electronic speed control (ESC) or battery eliminator circuit (BEC).

8. The method of claim 1, which combines two or more of the following techniques:
    using a pulse position modulation/pulse width modulation (PPM/PWM) signal;
    using a motor driving signal;
    distinguishing multiple motor vehicles using detected similar but not exact frequencies for signatures of multiple motor vehicles having any plurality of motors;
    using the signal coming from the BEC;
    using the signal coming from the wire between these components; and
    using the signal coming from the battery wire to each ESC or BEC.

9. The method of claim 1, that combines acoustic and EM signals to improve detection and or reject false alarms.

10. The method of claim 1, that combines acoustic and EM signals to determine range.

11. The method of claim 1, which uses amplitude to determine a heading to a detected vehicle.

12. The method of claim 1, that uses multiple antennas an one or more receivers with a common clock or a synchronized atomic clock to determine position by triangulating time of a flight for a detected vehicle and EM signal.

13. The method of claim 1, using multiple antennas and one or more receivers with a common clock or synchronized atomic clock to determine position from triangulating a phase shift for a detected vehicle and EM signal.

14. The method of claim 1, further comprising a series of devices as described to track the motion of vehicles in the airspace.

15. The method of claim 1, used in combination with acoustic, thermal, visual, radar, or Ladar detection to improve detection and or false alarm rejection.

16. The method of claim 1, used in combination with a device to detect the phase shift between the EM signal emanating from ESC into the motor and used to reduce false detections.

17. The method of claim 1, that uses a Directional antenna to measure a heading to the multi-rotor vehicle.

18. The method of claim 1, that uses an antenna null to deduce where the multi-rotor is not located, and hence narrow the region of where it is located.

19. The method of claim 1, which uses phase shift between multiple antennas to deduce direction and or range.

20. The method of claim 1, which uses signal strength to determine range to the multi-rotor vehicle.

21. The method of claim 1, which uses a plurality of devices to detect the phase shift between the EM signal emanating from ESC into the motor to use triangulation to determine a range to the multi-rotor vehicle.

22. The method of claim 1, which uses a plurality of directional antenna to use triangulation to determine a range to the multi-rotor vehicle.

* * * * *